March 27, 1951  G. E. DATH  2,546,215
FRICTION SHOCK ABSORBER FOR RAILWAY CAR TRUCKS
Filed April 26, 1949
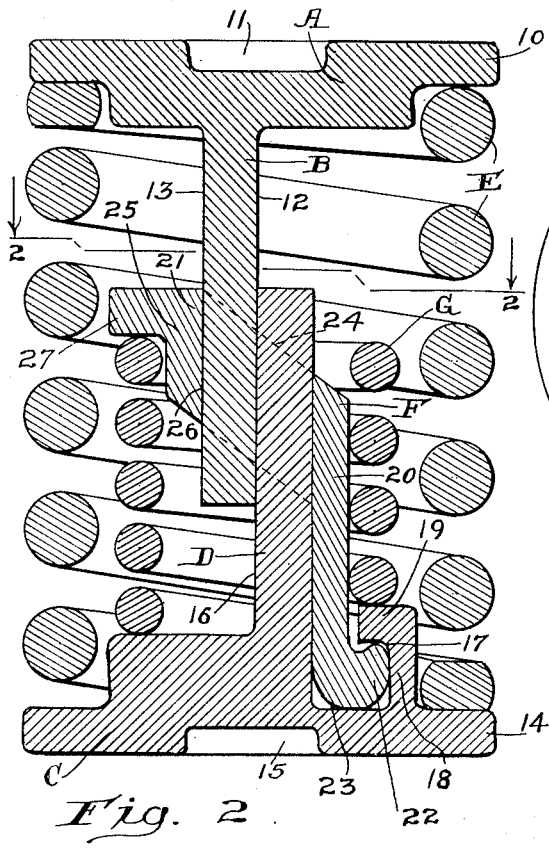
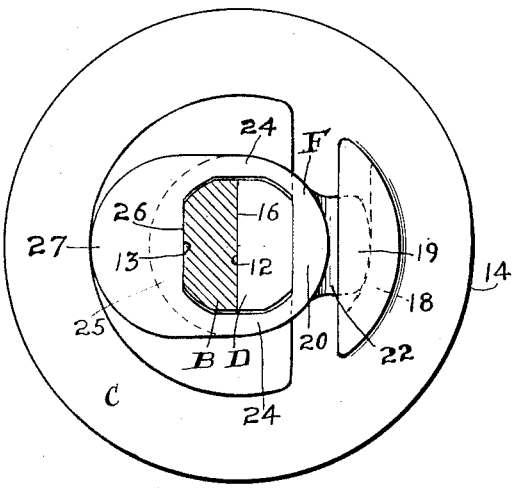
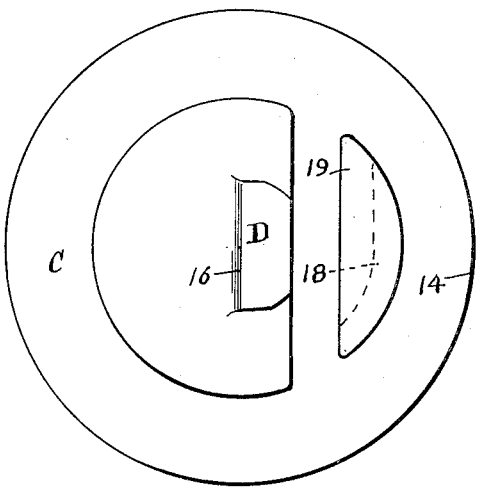
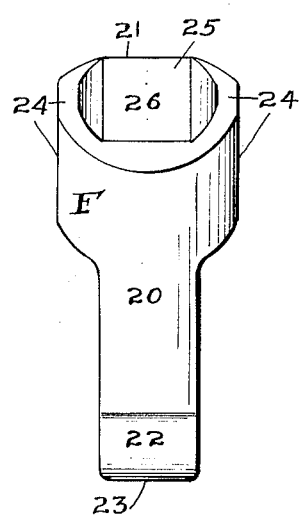
Inventor:
George E. Dath.
By Henry Fuchs.
Atty.

Patented Mar. 27, 1951

2,546,215

UNITED STATES PATENT OFFICE 2,546,215

FRICTION SHOCK ABSORBER FOR RAILWAY CAR TRUCKS

George E. Dath, Mokena, Ill., assignor to W. H. Miner, Inc., Chicago, Ill., a corporation of Delaware Application April 26, 1949, Serial No. 89,783

9 Claims. (Cl. 267—9)

This invention relates to improvements in friction shock absorbers especially adapted for use in railway car trucks to snub or dampen the action of the truck springs.

One object of the invention is to provide a friction shock absorber adapted to be substituted for one or more of the spring units of a cluster of truck springs of a railway car, comprising a pair of relatively slidable friction elements, and spring means opposing relative sliding movement of said elements, wherein spring actuated means is provided for pressing the friction elements into tight frictional engagement with each other.

A further object of the invention is to provide a shock absorber, as set forth in the preceding paragraph, wherein the means for pressing the friction elements into frictional engagement with each other includes a rocking yoke member embracing the friction elements at opposite sides, and spring means for rocking the yoke member to thereby force the same against the friction elements.

A more specific object of the invention is to provide a friction shock absorber comprising a pair of relatively movable followers, a post projecting from each follower and slidingly engaging the post of the other follower, a spring yieldingly opposing relative approach of said followers, a yoke enclosing said posts and embracing the same at opposite sides of the mechanism, said yoke being rockingly supported on one of said followers, and spring means reacting between said last named follower and the yoke for forcibly rocking the yoke to clamp the same against the posts and press the latter against each other.

Other objects of the invention will more clearly appear from the description and claims hereinafter following.

In the accompanying drawing forming a part of this specification, Figure 1 is a transverse, vertical sectional view of the improved shock absorber. Figure 2 is a horizontal sectional view, corresponding substantially to the line 2—2 of Figure 1. Figure 3 is a top plan view of the bottom post shown in Figure 1. Figure 4 is an elevational view of the rocking yoke member of my improved shock absorber.

My improved shock absorber, as illustrated in the drawing, comprises broadly a top follower A; a top post B depending from the follower A, a bottom follower C, a bottom post D upstanding from the follower C, a coil spring E surrounding the posts and bearing at its top and bottom ends on the top and bottom followers A and C, a rocking yoke member F supported on the follower C and embracing the posts B and D, and a second spring G surrounding the posts and bearing at opposite ends on said bottom follower C and the yoke member F.

The top follower A is in the form of a disclike plate, having the post B depending therefrom and formed integral therewith. The follower A is provided with a peripheral annular flange 10, forming an abutment for the top end of the coil spring E. The follower A is provided with an upwardly opening central seat 11 adapted to accommodate the usual spring centering projection of the top follower plate of the cluster of truck springs.

The post B is disposed to one side of the central vertical axis of the device, that is, to the left of said axis, as shown in Figures 1 and 2, and has vertically disposed, inner and outer, flat friction surfaces 12 and 13 on opposite sides thereof.

The bottom follower C is also in the form of a disclike plate having the post D upstanding therefrom and formed integral therewith. A laterally projecting, peripheral, annular flange 14 is provided on the follower C, serving as an abutment for the bottom end of the coil spring E. To accommodate the spring centering projection of the usual bottom spring follower plate of a truck spring cluster, the follower C has a downwardly opening, central seat 15 formed therein.

The upstanding post D has a lengthwise extending, flat friction surface 16 on its inner side, slidingly engaged with the friction surface 12 of the post B.

The follower C is recessed to provide an upwardly opening pocket 17 at the outer side of the base of the post D, extending in transverse direction, parallel to the outer side of said post. The pocket 17 is defined by a transversely extending, upstanding, outer wall 18, and an inwardly directed, horizontal flange 19 at the top of said wall.

The rocking yoke F comprises an upstanding platelike arm 20, extending along the outer side of the post D, having a yoke strap 21 at its upper end, and a hooklike flange 22 at its lower end. The lower end of the platelike arm 20 extends into the pocket 17 of the follower C and bears on said follower, the same being rounded off, as indicated at 23, to facilitate said rocking movement. The hooklike flange 22 is engaged beneath the flange 19, the extremity of the hook portion being rounded, as shown, to facilitate rocking.

The yoke strap 21 comprises two inwardly extending, barlike side members 24—24 formed integral with the platelike arm 20, and a transverse, barlike section 25 connecting the outer ends of the members 24—24. The side members 24—24 embrace the posts D and B along opposite side edges thereof and are upwardly inclined, as shown. The transverse section 25 has a flat, vertically extending friction surface 26 on its inner side bearing on the outer friction surface 13 of the post B. Along its upper edge, the transverse section 25 has a laterally outwardly projecting follower flange 27 forming an abutment for the upper end of the spring G.

The spring E, which is in the form of a relatively heavy, helical coil, surrounds the posts B and D and has its top and bottom ends bearing, respectively, on the flanges 10 and 14 of the top and bottom followers A and C.

The spring G, which is also in the form of a helical coil, is lighter than the spring E, and surrounds the yoke F. The bottom end of the spring E is seated on the follower C and its upper end bears on the flange 27 of the yoke. The spring G is under a predetermined amount of initial compression and thus exerts pressure on the yoke, tending to rock the same to the right, as seen in Figure 1, and press the friction posts against each other, the yoke acting in the manner of a rocking clamping element.

My improved shock absorber replaces one or more of the spring units of a truck spring cluster of a railway car, being interposed between the usual top and bottom spring plates which co-operate with said cluster.

The operation of my improved shock absorber is as follows: Upon the spring cluster of the truck of a railway car being compressed between the follower plates of said cluster, the shock absorber, which is disposed between said follower plates, is compressed therewith, thereby forcing the post B downwardly against the resistance of the spring E, sliding the post B on the post D and the friction surface 26 of the yoke F. During this lengthwise sliding movement of the posts B and D, the same are held in intimate contact by the action of the spring pressed rocking yoke F, and the required frictional resistance is developed on the engaging friction surfaces of said posts and the yoke F to effectively snub the action of the truck springs. Upon release of the mechanism, during recoil of the truck springs, the posts B and D are restored to the normal position shown in Figures 1 and 2 by the expansive action of the spring E.

As will be evident, the frictional resistance provided by my improved shock absorber is substantially constant during both compression and recoil of the truck springs, thus providing snubbing action during recoil of the springs as well as during compression of the same.

I claim:

1. In a friction shock absorber, the combination with a pair of followers relatively movable toward and away from each other; of a post on each follower projecting from the same toward the other follower and having lengthwise sliding engagement with the other post; a yoke member in rocking engagement with one of said followers and embracing said posts at opposite sides; spring means engaging said followers to yieldingly oppose relative approach of said followers; and spring means reacting between one of said followers and the yoke for rocking said yoke to force the posts against each other.

2. In a friction shock absorber, the combination with a pair of friction posts lengthwise movable with respect to each other, and having sliding frictional contact with each other; of spring means between said posts yieldingly opposing movement of said posts toward each other; a member rockingly supported on one of said posts, said member having a yoke strap enclosing said posts and bearing on the outer sides of both posts; and spring means reacting between said yoke and one of said posts for rocking said member with respect to the posts to press the latter into tight frictional contact with each other.

3. In a friction shock absorber, the combination with a friction post; of a second friction post, said posts having lengthwise sliding engagement with each other; a strap member surrounding said posts and embracing the same at opposite sides of the mechanism, and engaging the outer sides of both posts; means on said strap for supporting the same on one of said posts for rocking movement with respect to both of said posts; spring means reacting between said strap and one of said posts for rocking said strap to press said posts against each other; and additional spring means between said posts yieldingly opposing relative movement of said posts in lengthwise direction toward each other.

4. In a friction shock absorber, the combination with a friction post; of a second friction post movable lengthwise with respect to the first named post; a rocking member swingingly supported on one of said posts and embracing said posts at opposite sides of the mechanism, said rocking member having sliding engagement with the outer side of the other of said posts; spring means reacting between said rocking member and one of said posts for tilting said rocking member to press said posts together; and spring means between said posts yieldingly opposing relative lengthwise movement of said first and second named posts toward each other.

5. In a friction shock absorber, the combination with a friction post; of a second friction post movable lengthwise with respect to said first named post; a yoke member in rocking engagement with said first named post, said yoke member embracing said posts at their outer sides in sliding engagement with said second named post; spring means reacting between said yoke and one of said posts for rocking said yoke member to press said posts against each other; and additional spring means between said posts yieldingly opposing relative lengthwise movement of said second named post toward said first named post.

6. In a friction shock absorber, the combination with a friction post having a lengthwise extending friction surface on its inner side; of a second friction post having a lengthwise extending friction surface on the inner side thereof engaging the inner friction surface of said first named post; a rocking member swingingly supported on one of said posts, said member including a strap surrounding said posts and bearing on the outer sides of both posts; a spring under compression between said member and one of said posts to rock said member and press said posts together; and spring means between said posts yieldingly opposing movement of said posts toward each other.

7. In a friction shock absorber, the combination with a friction post having lengthwise extending friction surfaces at the inner and outer sides thereof; of a second friction post having a lengthwise extending friction surface on the inner side thereof engaged with the inner friction surface of said first named post; a rocking member swingingly supported on one of said posts, said member including a strap surrounding said posts and bearing on the outer sides of both posts, said strap having a friction surface engaging the friction surface on the outer side of said first named post; a spring under compression between said member and one of said posts for rocking said member and pressing said posts together; and spring means between said posts yieldingly opposing movement of said posts toward each other.

8. In a friction shock absorber, the combination with an end follower; of a second end follower, said followers being movable toward and away from each other lengthwise of the mechanism; a friction post on said first named follower extending toward the other follower, said post having a lengthwise extending friction surface on the inner side thereof; a post on said second named follower extending toward the first named follower, said last named post having a friction surface on the inner side thereof engaging the friction surface of said first named post; a yoke strap surrounding said posts and bearing on the outer sides of the same, said yoke strap having an arm extending along the outer side of said second named post and rockingly supported on said second named follower, said yoke strap having a follower flange projecting from the side thereof opposite to said arm; a spring under initial compression bearing at opposite ends on said second named follower and said flange of the yoke strap; and a spring surrounding said posts and bearing at opposite ends on said followers, respectively.

9. In a friction shock absorber, the combination with an end follower; of a second end follower, said followers being relatively movable toward and away from each other lengthwise of the mechanism; a yoke strap member having an arm extending from one end thereof and rockingly supported on said second named follower; a friction post on said second named follower extending through said yoke strap member toward the other follower, said post having its outer side bearing on the arm of said strap member, and having a lengthwise extending friction surface on its inner side; a second friction post on said first named follower extending through said yoke strap member toward the other follower alongside said first named post, said second named post having bearing engagement with the interior of said yoke strap member at the side thereof opposite to said arm, said second named post having a friction surface on its inner side engaged with the inner friction surface of said first named post; a follower projection on said yoke strap member extending from the side thereof opposite to said arm; a spring under compression reacting between said second named follower and the follower projection of said yoke strap member to rock said yoke strap member and press the posts laterally against each other; and spring means reacting between said first and second named followers to yieldingly resist relative movement thereof toward each other.

GEORGE E. DATH.

REFERENCES CITED

The following references are of record in the file of this patent:

UNITED STATES PATENTS

| Number | Name | Date |
| --- | --- | --- |
| 207,020 | Dick et al. | Aug. 13, 1878 |
| 1,169,863 | Peycke | Feb. 1, 1916 |
| 1,442,893 | Lewis | Jan. 23, 1923 |